United States Patent
Choi

(10) Patent No.: US 6,886,582 B2
(45) Date of Patent: May 3, 2005

(54) SPARE FUEL TANK IN A FUEL TANK OF A VEHICLE

(76) Inventor: Young Ill Choi, 305 E. Valencia Ave., Burbank, CA (US) 91502

( * ) Notice: Subject to any disclaimer, the term of this patent is extended or adjusted under 35 U.S.C. 154(b) by 9 days.

(21) Appl. No.: 10/679,210

(22) Filed: Oct. 6, 2003

(65) Prior Publication Data

US 2005/0072471 A1   Apr. 7, 2005

(51) Int. Cl.⁷ .............................. B65B 3/04; F23K 5/00
(52) U.S. Cl. ........................................ 137/264; 137/256
(58) Field of Search ............................... 137/255, 256, 137/264, 265

(56) References Cited

U.S. PATENT DOCUMENTS

| | | | |
|---|---|---|---|
| 2,644,514 A | * 7/1953 | Potter | 137/574 |
| 3,754,569 A | * 8/1973 | Fallotico | 137/572 |
| 4,188,969 A | * 2/1980 | Lotton et al. | 137/264 |
| 4,403,589 A | * 9/1983 | Bowen et al. | 123/525 |
| 5,951,050 A | * 9/1999 | Siekmann | 137/256 |
| 6,058,698 A | * 5/2000 | Coral et al. | 60/275 |
| 6,530,393 B2 | * 3/2003 | Reinelt | 137/256 |

* cited by examiner

Primary Examiner—Kevin Lee
(74) Attorney, Agent, or Firm—Eugene Oak

(57) ABSTRACT

A spare fuel tank, installed inside a main fuel tank, having a reasonable volumetric capacity, of small box shape, and having a spare fuel suction pipe there from to the fuel injection pipe. The spare tank of this invention is manufactured at the same time with the main tank, therefore, does not need separate fuel supplying or specific piping connection with the main fuel tank owing to its place. Releasing of the fuel from inside the spare tank is activated by power on the switch connected to a solenoid valve blocking the spare fuel suction pipe.

2 Claims, 3 Drawing Sheets

SPARE FUEL TANK IN A FUEL TANK OF A VEHICLE

BACKGROUND OF THE INVENTION

Most of spare fuel tanks disposed either as a separate type, outside the main fuel tank, or as a built-in type, inside the same or integrally constructed therewith. The separate type is defective in that it must be supplied fuel independently of the main tank and that it must be constantly checked to see if it is empty as it has no connection with the main tank. In some cases it communicates with the main tank, but it must then be more carefully checked for fear of being inadvertently emptied. The latter type appeared as an advanced type, and is widely used today. In one bottom corner of a main tank a certain space is separately occupied, in this type, for a spare tank by means of secluding or separating plates welded to the main tank. This advanced built-in type is apparently very convenient and practical in that it does not need individual or dual supplying of fuel because of automatic and simultaneous fuel supplying to both, and that it dispenses with the communication through piping between both tanks.

FIELD OF THE INVENTION

This invention relates to a spare fuel tank of a motor vehicle, more specifically, a spare fuel tank inside of a main fuel tank of a motor vehicle.

DESCRIPTION OF THE PRIOR ART

U.S. Pat. No. 1,419,145 to Kleinberg and U.S. Pat. No. 2,644,514 to Potter illustrate a spare fuel tank installed in a main fuel tank. The main drawback of their spare tank is that a driver must get out of the car and operate a valve manually to release the fuel in the spare tank.

U.S. Pat. No. 1,400,727 to Codd, U.S. Pat. No. 1,535,642 to Armknecht, and U.S. Pat. No. 1,671,242 Huthsing illustrate emergency fuel reservoir of cylinder shape dipped in a main fuel tank. To release the reserved fuel, the driver should operate manually the releasing means. U.S. Pat. No. 4,178,004 to Shinoda, et al. illustrates a spare fuel tank of vertically elongated shape and having a spare fuel suction pipe, which are installed inside of a main fuel tank. To release the fuel in the spare tank, the driver also approach to the switch valve (10), which is attached, on the fuel feeding line attached on the fuel tank assembly.

U.S. Pat. No. 6,505,644 to Coha, et al. illustrates a dual barrel jet fuel pump assembly for a fuel tank in a vehicle including a reservoir adapted to be disposed in a primary side of the fuel tank and having a top defining an overflow fuel level of the reservoir. Their design is applicable only to a dual barrel jet fuel pump assembly equipped fuel tank.

None of the prior art illustrates a simple and easy to use spare fuel tank as provided in this invention.

SUMMARY OF THE INVENTION

It is a primary object of this invention to provide, eliminating the shortcomings of the prior art, automatically and simultaneously supplied with fuel at the time of fuel supplying to the main tank, without the necessity of separate supplying of fuel thereto. It is another object of this invention to provide a spare tank, which does not need the constant checking of if it is unexpectedly emptied. The spare fuel tank, installed inside a main fuel tank, having a reasonable volumetric capacity, of small box shape, and having a spare fuel suction pipe there from to the fuel injection pipe. The spare tank of this invention is manufactured at the same time with the main tank. It does not need separate fuel supplying or specific piping connection with the main fuel tank owing to its place. Releasing of the fuel from inside the spare tank is activated by turn on the switch connected to a solenoid valve blocking the spare fuel suction pipe.

DETAILED DESCRIPTION OF THE PREFERRED EMBODIMENTS

Figure 1:
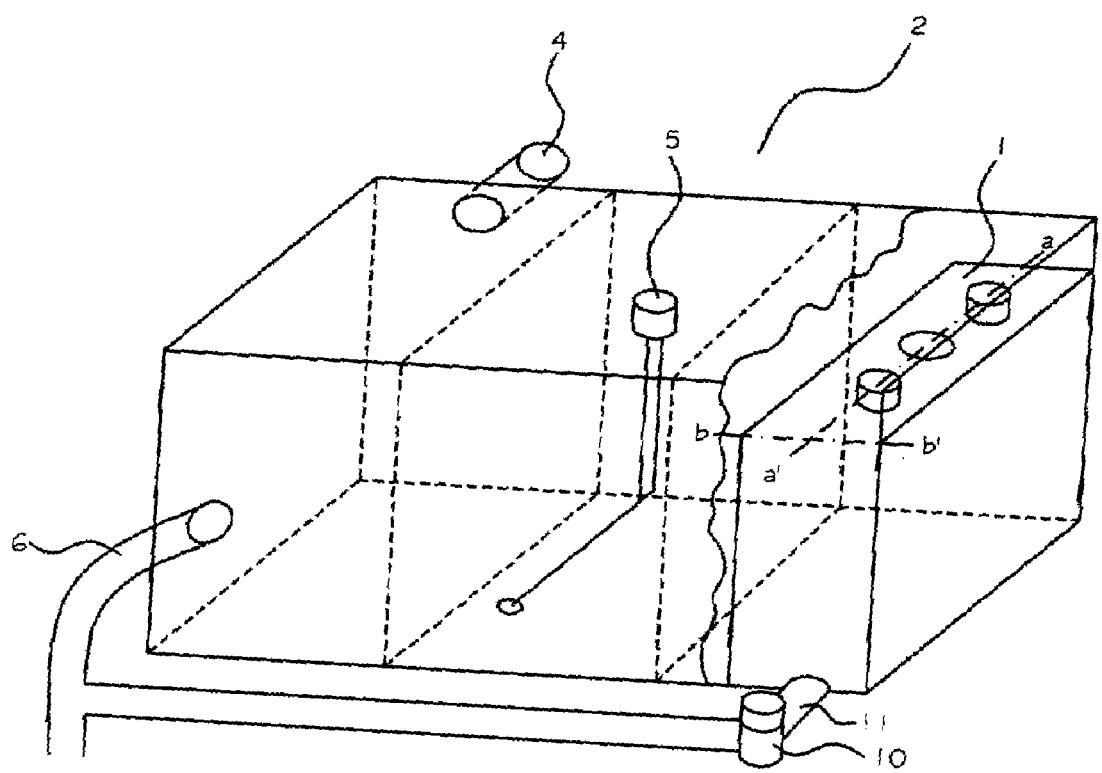
FIG. 1 is a partially dispatched schematic drawing for showing a spare fuel tank inside of a main fuel tank.
Figure 2:
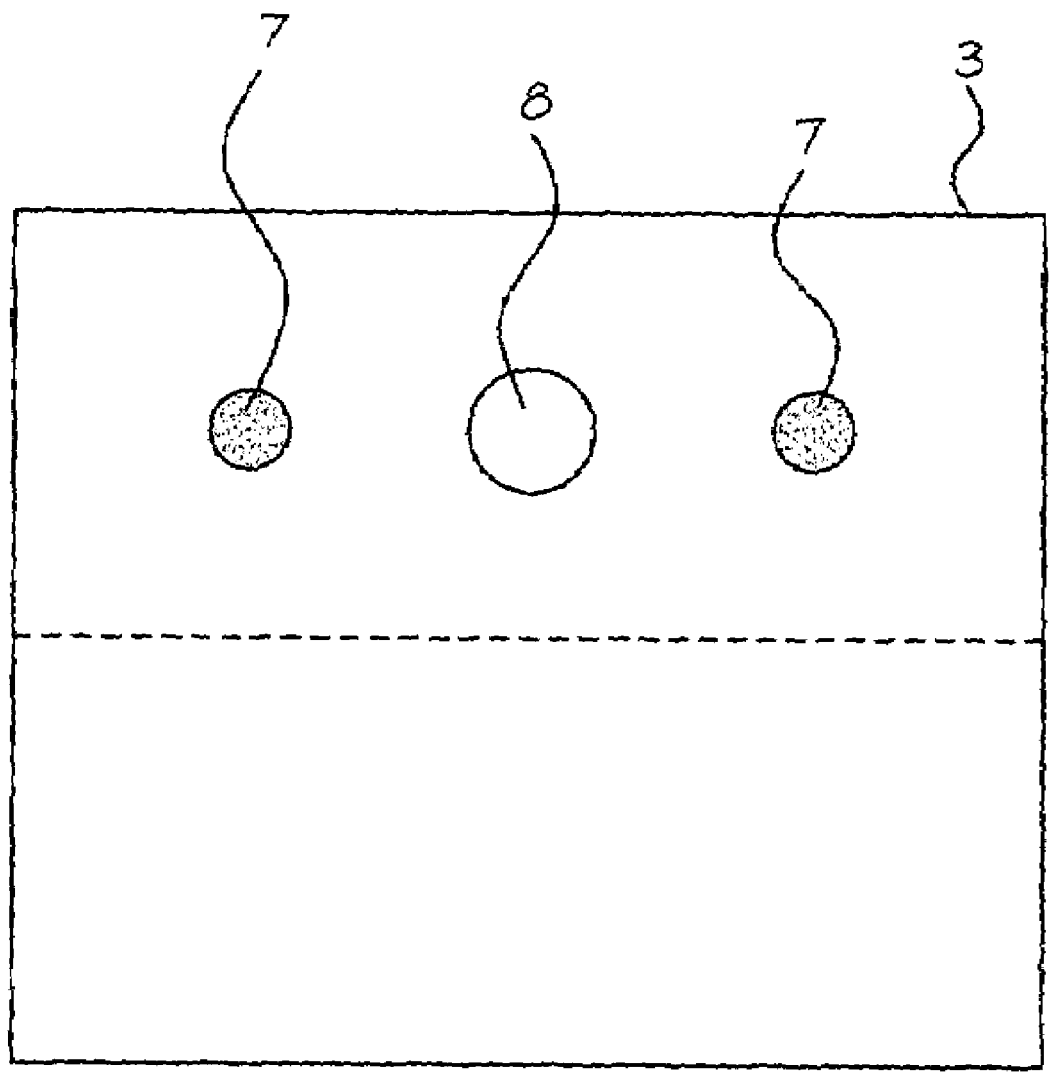
FIG. 2 is a stretched view of a spare fuel tank.

FIG. 1 is a partially dispatched schematic drawing for showing a spare fuel tank (1) inside of a main fuel tank (2). The spare fuel tank (1) is installed inside corner of a main tank (2) by folding and welding the metal sheet (3) of FIG. 2 to one corner of the main fuel tank (2). The main fuel tank (2) is equipped with fuel inlet pipe (4), level gauge (5), and fuel injection pipe (6) to engine same as many commercial fuel tanks.

Figure 3:
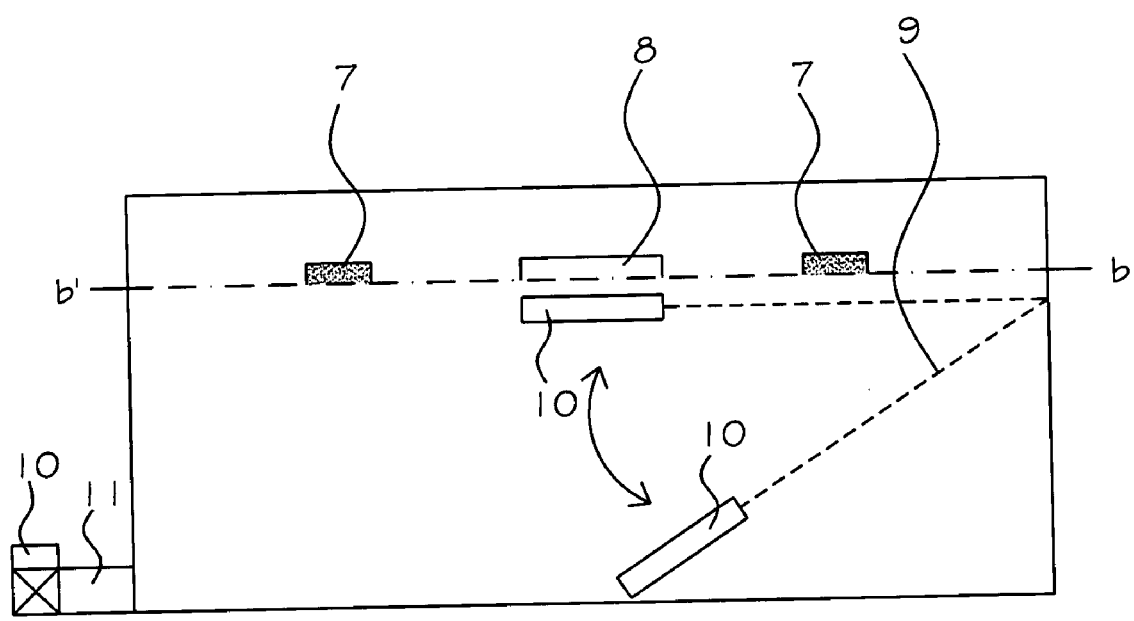
FIG. 3 is a cross sectional view along the line a–a' in FIG. 1 for showing inner side of the spare fuel tank and the relative position to the main fuel tank.

The spare fuel tank (1) is prepared by folding a metal sheet (3), on which two air filters (7) and one inlet hole (8) are developed, and welding the folded metal sheet (3) to a corner of the main fuel tank (2). FIG. 3 is a cross sectional view along the line a–a' in FIG. 1 for showing inner side of the spare fuel tank and the relative position to the main fuel tank.

A floating valve (9) is attached to one side of the main fuel tank (2) to align the floating cover (10) with the inlet hole (8). The air filters (7) are made of porous metal sponge.

Before the fuel level reaches the surface b–b' in FIG. 3, the spare fuel tank (1) is empty. Then, the floating valve (9) locates at the bottom of the spare fuel tank (1). When the fuel level reaches over b–b', the fuel starts to introduce into the spare fuel tank (1) through the inlet port (8). The floating valve (9) moves upward as the fuel level in the spare fuel tank increases. The air trapped inside of the spare fuel tank is released through the air filters (7). If the fuel level in the spare fuel tank reaches b–b', the floating valve (9) blocks the inlet port (8). Even after the spare fuel tank (1) is filled up, the fuel level in the main fuel tank rises until it fills the main fuel tank (2).

Even though the fuel level in the main fuel tank (2) drops below b–b' as the fuel consumed with running of the vehicle, the fuel in the spare fuel tank (1) is secured by the floating valve (9) blocking the inlet port (8) and the solenoid valve (10) blocking the fuel suction pipe (11) connected to the fuel injection pipe (6).

If the driver refills the main fuel tank (2) before activating the solenoid valve (10), the fuel in the spare tank (1) remains as full. If the driver cannot find a gas station even after the red 'empty' signal lamp on the driving gauge panel blinks, the driver may stop the car or turn on the spare fuel tank switch (an on/off switch) on the driver's gauge panel (not shown in this invention). Then the solenoid valve (10) is open and the fuel in the spare tank (1) is introduced to the fuel injection pipe (6). The timing to turn on the solenoid valve (10) is decided by the driver.

What is claimed is:

1. A spare fuel tank, having small box geometry installed in a corner of a main fuel tank, comprise of: 1) a fuel inlet, 2) two air filters made of metal sponge, 3) a floating valve, and 4) a solenoid valve physically connected to a fuel injection pipe of the main fuel tank and electrically connected to a manually operating on/off switch on driver's gauge panel.

2. A spare fuel tank, in claim 1, which is made from one folded metal sheet one end of which is welded to a bottom of the corner of a main fuel tank and the other end, on which a fuel inlet and the two air filters are developed, is welded to an inner wall of a side wall neighboring the bottom to which the one end is welded.

* * * * *